(12) United States Patent
Rogers (10) Patent No.: US 8,712,029 B2
(45) Date of Patent: Apr. 29, 2014

(54) METHOD AND SYSTEM FOR ROUTING TELEPHONY COMMUNICATIONS TOGETHER WITH MODIFIED CALLING PARTY IDENTIFIER INFORMATION

(75) Inventor: Danica Rogers, Ottawa (CA)

(73) Assignee: BCE Inc., Verdun, Québec (CA)

( * ) Notice: Subject to any disclaimer, the term of this patent is extended or adjusted under 35 U.S.C. 154(b) by 804 days.

(21) Appl. No.: 12/643,010

(22) Filed: Dec. 21, 2009

(65) Prior Publication Data

US 2010/0158225 A1 Jun. 24, 2010

(30) Foreign Application Priority Data

Dec. 24, 2008 (CA) .................................. 2647920

(51) Int. Cl.
*H04M 1/56* (2006.01)
*H04M 3/42* (2006.01)

(52) U.S. Cl.
USPC ............................... 379/212.01; 379/142.01

(58) Field of Classification Search
USPC ....................... 379/212.01, 265.02
See application file for complete search history.

(56) References Cited

U.S. PATENT DOCUMENTS

| | | | |
|---|---|---|---|
| 5,220,599 A | 6/1993 | Sasano et al. |
| 5,276,731 A | 1/1994 | Arbel et al. |
| 5,299,260 A | 3/1994 | Shaio |
| 5,329,578 A | 7/1994 | Brennan et al. |
| 5,392,342 A | 2/1995 | Rosenthal |
| 5,430,791 A | 7/1995 | Feit et al. |
| 5,465,295 A | 11/1995 | Furman |
| 5,479,496 A | 12/1995 | Endo et al. |
| 5,506,890 A | 4/1996 | Gupta et al. |
| 5,533,107 A | 7/1996 | Irwin et al. |
| 5,596,631 A | 1/1997 | Chen |
| 5,623,537 A | 4/1997 | Ensor et al. |
| 5,764,746 A | 6/1998 | Reichelt |
| 5,793,859 A | 8/1998 | Matthews |
| 5,875,240 A | 2/1999 | Silverman |
| 5,987,100 A | 11/1999 | Fortman et al. |
| 5,999,613 A | 12/1999 | Nabkel et al. |
| 6,005,870 A | 12/1999 | Leung et al. |

(Continued)

FOREIGN PATENT DOCUMENTS

| | | |
|---|---|---|
| CA | 2533514 | 2/2005 |
| EP | 0569164 | 10/1993 |

(Continued)

OTHER PUBLICATIONS

One Voice Technologies, "Send E-mail. Voice-to-Text Messaging Solution", www.onev.com/solutions/mobile_send.asp (Continued)

*Primary Examiner* — Joseph T Phan (57) ABSTRACT

A method, comprising causing a telephony communication originating from a calling party communication device to be routed to a first called party communication device together with calling party identifier information associated with the calling party communication device. The method further comprises receiving an identification of a second called party communication device to which the telephony communication should be routed, and generating modified calling party identifier information associated with the telephony communication on the basis of modification information received from the first called party communication device. Finally, the method comprises routing the telephony communication to the second called party communication device together with the modified calling party identifier information.

52 Claims, 3 Drawing Sheets

(56) References Cited

U.S. PATENT DOCUMENTS

| | | | |
|---|---|---|---|
| 6,067,349 A | 5/2000 | Suder et al. | |
| 6,134,310 A | 10/2000 | Swan et al. | |
| 6,246,871 B1 | 6/2001 | Ala-Laurila | |
| 6,295,353 B1 | 9/2001 | Flockhart et al. | |
| 6,304,573 B1 | 10/2001 | Hicks, III | |
| 6,389,117 B1 | 5/2002 | Gross et al. | |
| 6,400,808 B1 | 6/2002 | Burg | |
| 6,438,217 B1 | 8/2002 | Huna | |
| 6,529,592 B1 | 3/2003 | Khan | |
| 6,668,055 B2 | 12/2003 | Marwell et al. | |
| 6,721,397 B1 | 4/2004 | Lu | |
| 6,728,360 B1 | 4/2004 | Brennan | |
| 6,788,778 B2 | 9/2004 | Tatsumi | |
| 6,826,271 B1* | 11/2004 | Kanabar et al. | 379/212.01 |
| 6,829,332 B2 | 12/2004 | Farris et al. | |
| 6,898,274 B1 | 5/2005 | Galt et al. | |
| 6,961,559 B1 | 11/2005 | Chow et al. | |
| 7,162,021 B1 | 1/2007 | Johnson et al. | |
| 7,269,412 B2* | 9/2007 | Bacon et al. | 455/415 |
| 7,280,646 B2* | 10/2007 | Urban et al. | 379/142.01 |
| 7,283,512 B2 | 10/2007 | Hall | |
| 7,295,656 B2* | 11/2007 | Ruckart | 379/88.21 |
| 7,388,949 B2* | 6/2008 | Contractor et al. | 379/142.06 |
| 7,463,727 B2* | 12/2008 | Urban et al. | 379/142.01 |
| 7,474,432 B1 | 1/2009 | Kirchhoff et al. | |
| 7,586,898 B1* | 9/2009 | Koch et al. | 370/352 |
| 7,609,832 B2* | 10/2009 | Kreiner et al. | 379/265.02 |
| 7,672,444 B2* | 3/2010 | Perrella et al. | 379/265.02 |
| 7,978,833 B2* | 7/2011 | Urban et al. | 379/142.04 |
| 8,023,632 B2 | 9/2011 | Gruchala | |
| 8,031,851 B2 | 10/2011 | Holt et al. | |
| 8,073,121 B2* | 12/2011 | Urban et al. | 379/142.01 |
| 8,102,994 B2* | 1/2012 | Perrella et al. | 379/265.02 |
| 8,160,226 B2* | 4/2012 | Wood et al. | 379/210.02 |
| 8,175,904 B2 | 5/2012 | Templeton | |
| 8,224,662 B2* | 7/2012 | Matz et al. | 705/1.1 |
| 8,243,895 B2 | 8/2012 | Jain et al. | |
| 8,243,909 B2* | 8/2012 | Wood et al. | 379/210.03 |
| 2002/0039407 A1 | 4/2002 | O'Donovan et al. | |
| 2002/0086662 A1 | 7/2002 | Culliss | |
| 2003/0003900 A1 | 1/2003 | Goss et al. | |
| 2003/0058839 A1 | 3/2003 | D'Souza | |
| 2003/0060210 A1 | 3/2003 | Ravishankar et al. | |
| 2004/0028026 A1 | 2/2004 | McClung et al. | |
| 2004/0095925 A1 | 5/2004 | Cody et al. | |
| 2005/0053218 A1 | 3/2005 | Kim | |
| 2005/0054335 A1 | 3/2005 | Pearson et al. | |
| 2005/0064855 A1 | 3/2005 | Russell | |
| 2005/0100155 A1 | 5/2005 | Trinkel et al. | |
| 2005/0207361 A1 | 9/2005 | Rosenberg et al. | |
| 2005/0245236 A1 | 11/2005 | Servi et al. | |
| 2006/0029195 A1 | 2/2006 | Mullis et al. | |
| 2006/0177033 A1 | 8/2006 | Allen et al. | |
| 2006/0190591 A1 | 8/2006 | Bobde et al. | |
| 2007/0111743 A1 | 5/2007 | Leigh et al. | |
| 2007/0143397 A1 | 6/2007 | Guedalia et al. | |
| 2007/0147349 A1 | 6/2007 | Bangor et al. | |
| 2007/0153991 A1 | 7/2007 | Daigle | |
| 2007/0155370 A1 | 7/2007 | Daigle | |
| 2007/0263781 A1 | 11/2007 | Goldman et al. | |
| 2007/0299927 A1 | 12/2007 | Knauerhase | |
| 2009/0003548 A1 | 1/2009 | Baird et al. | |
| 2009/0055502 A1 | 2/2009 | Agarwal et al. | |
| 2009/0086720 A1 | 4/2009 | Westlake | |
| 2009/0111474 A1 | 4/2009 | Hill et al. | |
| 2009/0247188 A1 | 10/2009 | Ridley et al. | |
| 2012/0106725 A1 | 5/2012 | Smith et al. | |

FOREIGN PATENT DOCUMENTS

| | | |
|---|---|---|
| EP | 1211875 | 6/2002 |
| EP | 1583341 | 10/2005 |
| EP | 1684478 | 7/2006 |
| GB | 2387737 B | 1/2006 |
| JP | 2002016701 A | 1/2002 |
| WO | 9107041 | 5/1991 |
| WO | 03041362 | 5/2003 |
| WO | 2006129296 | 12/2006 |
| WO | 2007033457 | 3/2007 |
| WO | 2007056824 | 5/2007 |
| WO | 2007071007 | 6/2007 |
| WO | WO2008042990 | 4/2008 |
| WO | 2008067631 | 6/2008 |
| WO | 2008077226 | 7/2008 |

OTHER PUBLICATIONS

Tyson J. et al., "How VoIP Works", 2005, http://www.engedi.net/documents/HowVoIPWorks_Feb.pdf, Sep. 2008.

http://www.google.com/googlevoice/about.html.

Nunn, A., "Voice Evolution", BT Technology Journal, Kluwer Academic Publishers, DO, vol. 23, No. 1, Jan. 1, 2005, pp. 120-133, XP019218795, ISSN: 1573-1995, DOI: DOI: 10.1007/S10550-005-0113-3.

Office Action issued on Aug. 31, 2012 in connection with U.S. Appl. No. 12/809,711, 30 pages.

Office Action issued on Sep. 10, 2012 in connection with U.S. Appl. No. 12/809,806, 15 pages.

Office Action issued on Oct. 15, 2012 in connection with U.S. Appl. No. 12/673,233, 12 pages.

Office Action issued on Nov. 8, 2012 in connection with U.S. Appl. No. 12/745,352, 22 pages.

Office Action issued on Feb. 8, 2013 in connection with U.S. Appl. No. 12/809,711, 41 pages.

Office Action issued on Jan. 4, 2013 in connection with U.S. Appl. No. 12/809,407, 31 pages.

Office Action issued on Jun. 6, 2013 in connection with U.S. Appl. No. 12/674,262, 10 pages.

Office Action issued on Jun. 18, 2013 in connection with U.S. Appl. No. 12/743,325, 9 pages.

Office Action issued on Jul. 19, 2013 in connection with U.S. Appl. No. 12/745,352, 22 pages.

Office Action issued on Aug. 23, 2013 in connection with U.S. Appl. No. 12/809,711—45 pages.

Office Action issued on Aug. 15, 2013 in connection with U.S. Appl. No. 12/673,233—11 pages.

Examiner's Report issued on Aug. 12, 2013 in connection with Canadian Patent Application 2,710,245, 7 pages.

Office Action issued on Oct. 9, 2013 in connection with U.S. Appl. No. 12/743,980, 12 pages.

Notice of Allowance issued on Nov. 5, 2013 in connection with U.S. Appl. No. 12/809,711, 13 pages.

Notice of Allowance issued on Nov. 20, 2013 in connection with U.S. Appl. No. 12/674,262, 13 pages.

* cited by examiner

| | Subscriber ID Info (202) | Network Identifier Tel # (204) | Calling Party Identifier Info (206) | Call Processing Info (208) | | |
|---|---|---|---|---|---|---|
| 200₁ | | Network Identifier Tel # | Calling Party Identifier Info | -Call Transfer -Calling Line Modification | | 250₁ |
| 200₂ | | Network Identifier ESN and/or Tel # | Calling Party I.D. Info Tel# 555-555-9876 | -Call Display -Call Transfer -Calling Line Modification | | 250₂ |
| 200₃ | | Network Identifier (Tel #) 555-555-1234 | "XYZ Corp" | User ID Info (210) | Device ID Info (212) | Call Processing Info (208) |
| | | | | "Janet" | IP Address+Tel # | -Call Display -Call Transfer -Calling Line Modification | 252₁ |
| | | | | "Joe" | Tel # | -Call Display -Call Transfer -Calling Line Modification | 252₂ |
| 200₄ | | Network Identifier (Tel #) 555-555-1111 | "The Smith Family" | User ID Info (210) | Device ID Info (212) | Call Processing Info (208) |
| | | | | "Barb" | Tel #+ESN | -Call Display -Call Transfer -Calling Line Modification | 254₁ |
| | | | | "Bob" | Tel #+ESN | -Call Display -Call Transfer -Calling Line Modification | 254₂ |
| | | | | "Billy" | Tel #+ESN | -Call Display -Call Transfer -Calling Line Modification | 254₃ |
| | | | | Home Phone | Tel # | -Call Display -Call Transfer -Calling Line Modification | 254₄ |
| 200ₖ | | | | | | |

METHOD AND SYSTEM FOR ROUTING TELEPHONY COMMUNICATIONS TOGETHER WITH MODIFIED CALLING PARTY IDENTIFIER INFORMATION

CROSS REFERENCE TO RELATED APPLICATIONS

This application claims the benefit under 35 USC 119(a) from Canadian Patent Application No. 2,647,920, entitled "Method and System for Routing Telephony Communications Together with Modified Calling Party Identifier Information" filed in the Canadian Patent Office on Dec. 24, 2008, the contents of which are incorporated herein by reference.

FIELD OF THE INVENTION

The present invention relates generally to the field of calling party identifiers, and more specifically to a system and method for enabling the modification of calling party identifier information when a telephony communication is being transferred.

BACKGROUND

Most telephony service providers offer a variety of telephony features to their customers. These telephony features help telephony users to manage the way their incoming and outgoing communications are handled. Some non-limiting examples of such telephony features include call waiting, call forwarding, "find me/follow me" (FM/FM) call forwarding, call transferring, distinctive ringing, selective call rejection, selective call acceptance, outgoing call blocking (or barring), etc.

One particular feature that is offered by many telephony service providers is a "calling line identification (CLID) displaying" feature. For subscribers to this feature, calling line identification information associated with a calling party's communication device is displayed on the called party's communication device. This allows the called party to see the calling line identification information that is associated with the communication device that is originating the call. The calling line identification information can either be a phone number associated with the calling party communication device or a name associated with a user of the calling party communication device, among other possibilities. In this manner, a called party will be able to determine who is originating the call prior to answering the call.

In existing "CLID displaying" systems, when a call is transferred via either a direct transfer or an assisted transfer, the calling line identification of the initial calling party is displayed to the second called party. However, a deficiency with such systems is that the second called party is not aware that the call that he/she is receiving is a transferred call, or that there was an intermediary. As a result, this can be confusing for the called party to whom the call has been transferred, since they will not necessarily be aware that the call was transferred.

U.S. Pat. No. 6,826,271 discloses a method for enabling the original calling party's calling party identifier information to be displayed when a called party transfers the call from the original calling party to a second called party. However, in many circumstances, the calling line identification information that is being displayed to the second called party is inaccurate or limited in the information that it conveys. For example, the calling line identification information may indicate "Anonymous" or "D. Rogers", such that it is unclear whether it's Dianne or Dave Rogers, or even Grandpa who lives with Dianne and Dave. As such, this inaccurate or limited information is not necessarily useful for the second called party.

Thus, there remains a need in the industry to provide a technological solution that alleviates, at least in part, some of the deficiencies associated with the manner in which calling line identification information is provided when calls are transferred or routed from a first called party to a second called party.

SUMMARY OF THE INVENTION

In accordance with a first broad aspect, the present invention provides a method, comprising causing a telephony communication originating from a calling party communication device to be routed to a first called party communication device together with calling party identifier information associated with the calling party communication device. The method further comprises receiving an identification of a second called party communication device to which the telephony communication should be routed, and generating modified calling party identifier information associated with the telephony communication on the basis of modification information received from the first called party communication device. Finally, the method comprises routing the telephony communication to the second called party communication device together with the modified calling party identifier information.

In accordance with a second broad aspect, the invention provides a system. The system comprises a routing entity for routing a telephony communication originating from a calling party communication device to a first called party communication device together with calling party identifier information associated with the calling party communication device, and a processing entity for receiving an identification of a second called party communication device to which the telephony communication should be routed. The processing unit is further operative for generating modified calling party identifier information associated with the telephony communication on the basis of modification information received from the first called party communication device and causing the routing entity to route the telephony communication to the second called party communication device together with the modified calling party identifier information.

In accordance with a third broad aspect, the invention provides a network entity that comprises a processing unit and an output. The processing unit is operative for causing a telephony communication originating from a calling party communication device to be routed to a first called party communication device together with calling party identifier information associated with the calling party communication device, receiving an identification of a second called party communication device to which the telephony communication should be routed and generating modified calling party identifier information associated with the telephony communication on the basis of modification information received from the first called party communication device. The output is operative for releasing the modified calling party identifier information to a routing entity such that the telephony communication is routed to the second called party communication device together with the modified calling party identifier information.

In accordance with a fourth broad aspect, the invention provides a computer-readable storage medium comprising a program element for execution by a network entity. The program element comprises a first program code for identifying a calling party identifier associated with a calling party communication device, a second program code for causing a telephony communication originating from the calling party communication device to be routed to a first called party communication device together with the calling party identifier information associated with the calling party communication device, a third program code for generating modified calling party identifier information upon receipt of an identification of a second called party communication device to which the telephony communication should be routed and a fourth program code for causing the telephony communication to be routed to the second called party communication device together with the modified calling party identifier information.

These and other aspects and features of the present invention will now become apparent to those of ordinary skill in the art upon review of the following description of specific embodiments of the invention in conjunction with the accompanying drawings.

It is to be expressly understood that the description and drawings are only for the purpose of illustration of certain embodiments of the invention and are an aid for understanding. They are not intended to be a definition of the limits of the invention.

DETAILED DESCRIPTION

Figure 1:
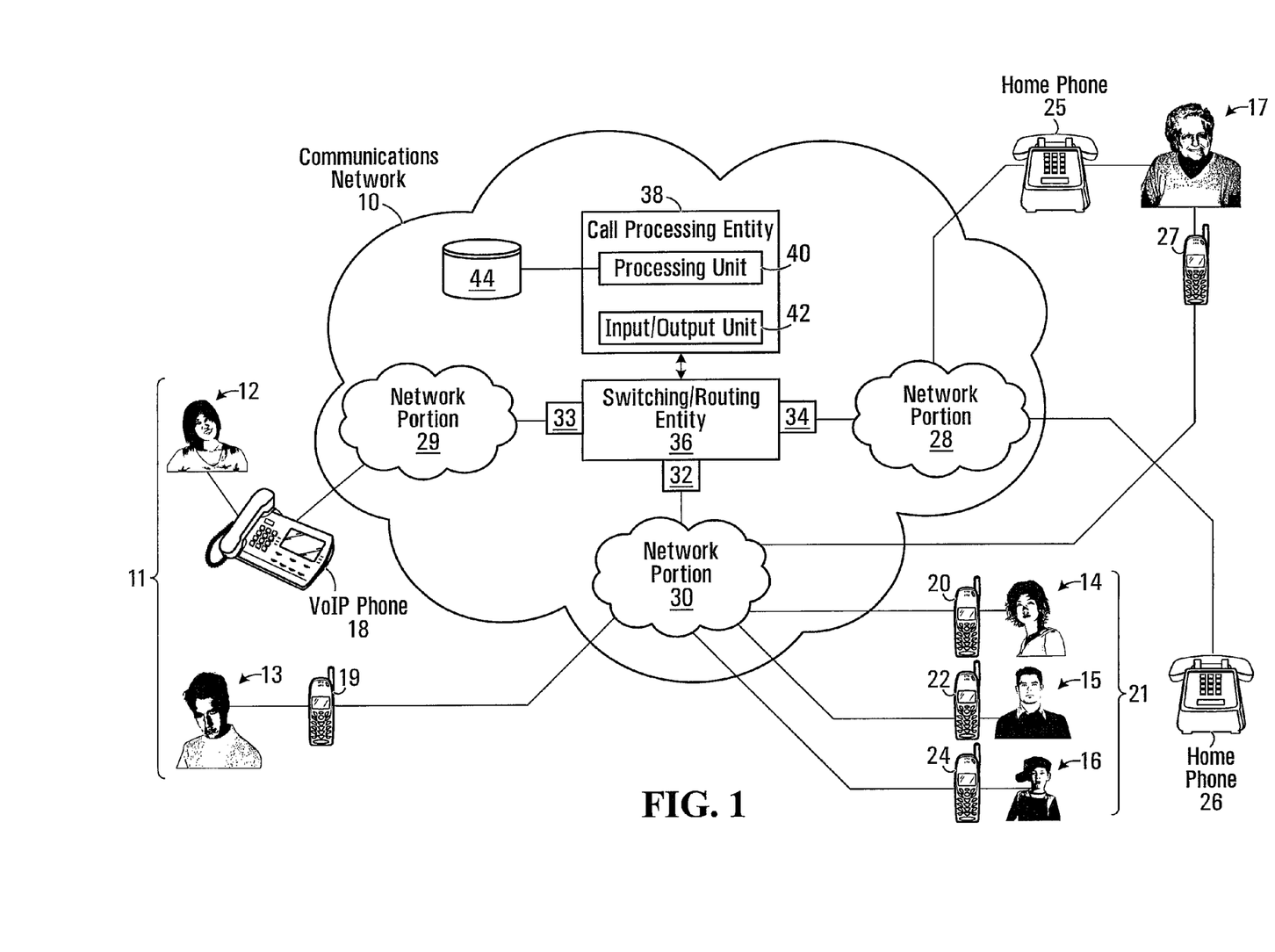
FIG. 1 shows a communication network comprising a call processing entity for processing calls in accordance with a non-limiting embodiment of the present invention.

Shown in FIG. 1 is a non-limiting example of an architecture for a communications network 10 that is suitable for enabling communication between communication devices associated to different customers, such as customers 12, 13, 14, 15, 16, and 17, among others. Although only six customers 12, 13, 14, 15, 16, and 17 are shown in FIG. 1, it should be appreciated that the communications network 10 is suitable for enabling communication between hundreds of thousands of customers (if not more) via their associated communication devices.

In today's society, many telephony customers have multiple communication devices that they use on a regular basis in order to originate and receive phone calls, emails, instant messages and/or text messages. It is not unusual for a given telephony user to have a cellular phone (or smart phone), a home phone and a work-place phone each having a separate phone number. For example, as shown in FIG. 1, customer 17 is associated with two different communication devices; namely communication device 25 (that is a plain old telephony POTS phone) and communication device 27 (that is a wireless phone). Either of communication devices 25 and 27 can be employed by customer 17 to effect telephonic communications, including handling incoming calls, originating outgoing calls, and participating in calls in progress.

Although, in this example, communication device 27 is customer 17's wireless phone, and communication device 25 is customer 17's home phone, it should be appreciated that each of the communication devices 25 and 27 could be any type of communication device suitable for originating, receiving and participating in communications with other communication devices through the communications network 10. For example, each one of the communication devices 25 and 27 could be any one of a wired Plain Old Telephony System (POTS) phone (including a cordless phone), a wireless phone (e.g., a cellular phone or other mobile communication device including a telephony-enabled personal digital assistant (PDA)), a Voice-over-Internet Protocol (VoIP) phone, a POTS phone equipped with an analog terminal adapter (ATA), a soft phone (i.e., a computer equipped with telephony software), or a telephony-enabled television (TV) unit (e.g., a set-top box connected to a television and a remote control). Depending on the functionality of each communication device 25 and 27, a call originated by, destined for, or in progress at either of the communication devices 25 and 27 may be a voice call, a video call, a multimedia call, or any other type of call. Although customer 17 is associated with only two different communication devices 25 and 27, it should be appreciated that in various other embodiments, customer 17 could be associated with any number of communication devices.

In addition, many telephony customers may have one or more communications devices that are part of a group subscription, such as a "family" subscription or a "small business" subscription, among other possibilities. With certain types of group subscriptions, all of the communication devices that are part of the group subscription can be reached using a common network identifier, such as a telephone number.

For example, in the embodiment shown in FIG. 1, the communication devices 18 and 19, associated with customers 12 and 13, are grouped together under a common subscription belonging to a small business, which will be referred to as "XYZ Corp" 11. Customer 12 (aka "Janet") is associated with communication device 18 (that is a VoIP phone) and customer 13 (aka "Joe") is associated with communication device 19 (that is a wireless phone). These communication devices 18 and 19 allow customers 12 and 13 to effect telephonic communications, including handling incoming calls, originating outgoing calls, and participating in calls in progress. However, both of communication devices 18 and 19 can be reached using a common network identifier, such as a single telephone number.

In addition, in the embodiment shown in FIG. 1, the communication devices 20, 22, 24 and 26, associated with customers 14, 15 and 16, are grouped together under a common subscription belonging to "the Smith Family" 21. Within the Smith Family 21, customer 14 (aka "Barb") is associated with communication device 20 (that is a wireless phone), customer 13 (aka "Bob") is associated with communication device 22 (that is a wireless phone) and customer 16 (aka "Billy") is associated with communication device 24 (that is also a wireless phone). In addition, the Smith Family 21 is also associated with a communication device 26 (that is a Plain Old Telephony System (POTS) home phone). As such, the family members 14, 15 and 16 are associated with multiple communication devices, one of which, namely the communication device 26, is shared by all members of the family. All of communication devices 20, 22, 24 and 26 allow customers 14, 15 and 16 to effect telephonic communications, including handling incoming calls, originating outgoing calls, and participating in calls in progress. In addition, all of communication devices 20, 22, 24 and 26 can be reached using a common network identifier, such as a telephone number.

The manner in which incoming calls are processed for the communication devices 18 and 19 (that may be reached by a common network identifier), and the manner in which incoming calls are processed for the communication devices 20, 22, 24 and 26 (that may also be reached by a common network identifier), is described in more detail in co-pending application having serial number PCT/CA2007/002363 filed on Dec. 27, 2007, the contents of which are incorporated herein by reference.

Although communication devices 18 and 19 are shown as being a VoIP phone and a wireless phone respectively, it should be appreciated that each of the communication devices 18 and 19 could be any type of communication device suitable for originating, receiving and participating in telephony communications. In addition, although communication devices 20, 22 and 24 are shown as wireless phones and communication device 26 is a POTS phone, it should be appreciated that each of the communication devices 20, 22, 24 and 26 could be any type of communication device suitable for originating, receiving and participating in telephony communications.

For example, each one of the communication devices 18, 19, 20, 22, 24 and 26 could be any one of a wired Plain Old Telephony System (POTS) phone (including a cordless phone), a wireless phone (e.g., a cellular phone or other mobile communication device including a telephony-enabled personal digital assistant (PDA)), a Voice-over-Internet Protocol (VoIP) phone, a POTS phone equipped with an analog terminal adapter (ATA), a soft phone (i.e., a computer equipped with telephony software), or a telephony-enabled television (TV) unit (e.g., a set-top box connected to a television and a remote control). Depending on the functionality of each communication device 18, 19, 20, 22, 24 and 26, a call originated by, destined for, or in progress at either of the communication device 18, 19, 20, 22, 24 and 26 may be a voice call, a video call, a multimedia call, or any other type of call.

The communications network 10 shown in FIG. 1 includes network portions 28, 29 and 30 that enable the handling of incoming calls, outgoing calls and calls in progress for communication devices 18, 19, 20, 22, 24, 25, 26 and 27. Each of the communication devices 18, 19, 20, 22, 24, 25, 26 and 27 is connected to a switching/routing entity 36 via one of the network portions 28, 29 and 30 of the communications network 10. As will be described in more detail below, the communications network 10 may comprise a portion of one or more of the Public Switched Telephone Network (PSTN), a wireless network (e.g., a cellular network), and a data network (e.g., the Internet). The switching/routing entity 36 enables the communication devices 18, 19, 20, 22, 24, 25, 26 and 27 to reach or be reached by any of various other communication devices (which are not shown for the sake of simplicity).

The nature of the network portions 28, 29 and 30 and the switching/routing entity 36 will depend on the nature of the communication devices 18, 19, 20, 22, 24, 25, 26 and 27 being used, and where the switching/routing entity 36 resides in the communications network 10. For example, communication devices 19, 20, 22, 24 and 27 are wireless communication devices, and as such, the switching/routing entity 36 may reside in a wireless network (that could be specific to them). In addition, the network portion 30 may comprise a wireless link in combination with a base station and a network-side wireline link, and the switching/routing entity 36 may be part of a mobile switching center.

The communication devices 25 and 26 are wired POTS phones, and as such, the switching/routing entity 36 may reside in the PSTN environment. In addition, the network portion 28 may comprise a telephone line in the PSTN and the switching/routing entity 36 may be part of a central office switch.

The communication device 18 is a VoIP phone, (or a POTS phone equipped with an ATA), and as such, the switching/routing entity 36 may reside in a data network. In such a case, the network portion 29 may comprise a digital communications link (e.g., Ethernet) and the switching/routing entity 36 may be part of a router (e.g., an edge router or a core router) or a softswitch. In accordance with a specific non-limiting example, the switching/routing entity 36 can be the MCS 5200 Soft Switch manufactured by Nortel Networks Limited of 8200 Dixie Road, Brampton, Ontario L6T 5P6, Canada, although it should be appreciated that this is but one non-limiting example among many possibilities within the scope of the present invention.

In yet another example of implementation, where a communication device (not shown) is a soft phone, its associated network portion may comprise a digital communications link (e.g., a digital subscriber line (DSL) link or a coaxial cable) and the switching/routing entity 36 may be part of a server equipped with a modem. It will be appreciated that various other implementations of network portions and the switching/routing entity 36 are possible (e.g., such as where the communication device is a telephony-enabled TV unit).

It will also be appreciated that, as shown in FIG. 1, the switching/routing entity 36 may span across different networks (i.e., PSTN, wireless, and/or data) in which case the switching/routing entity 36 comprises one or more gateways 32, 33 and 34 for enabling communication and interoperability between these networks. Alternatively, the switching/routing entity 36 may not include the gateways 32, 33 and 34, in which case the gateways could be part of a separate server that is not shown. Such gateways are well known to those skilled in the art and need not be described in further detail herein.

The switching/routing entity 36 is operative to effect switching/routing operations to help route an outgoing call originating from one of the communication devices 18, 19, 20, 22, 24, 25, 26 and 27 and destined for a called party device. In addition, the switching/routing entity 36 is operative to effect switching/routing operations to help route an incoming call originated at a calling party device and destined for one of the communication devices 18, 19, 20, 22, 24, 25, 26 and 27. Furthermore, the switching/routing entity 36 is communicatively coupled to a call processing entity 38, which is described later on, and interacts therewith. The switching/routing entity 36 comprises suitable hardware, firmware, software, control logic, or a combination thereof for implementing its functionality.

The call processing entity 38 is communicatively coupled to a database 44, and is operative to interact with the switching/routing entity 36 and the database 44 in order to effect various call processing operations when communication devices (such as the communication devices 18, 19, 20, 22, 24, 25, 26 and 27) receive incoming calls, originate outgoing calls, or participate in calls in progress.

Figure 2:
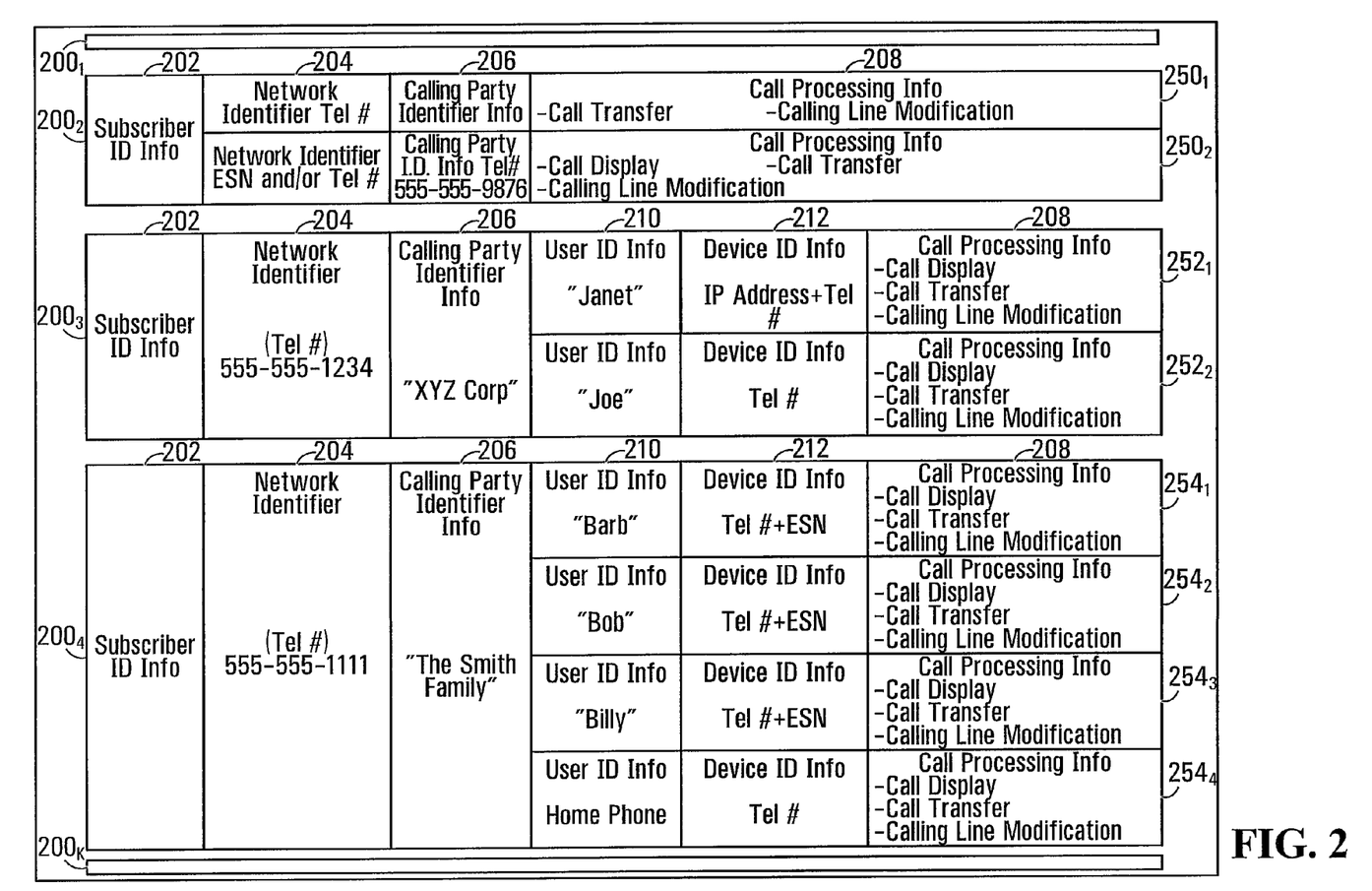
FIG. 2 shows an example of the potential contents of the database 44 shown in FIG. 1.

FIG. 2 shows a non-limiting example of the potential contents of the database 44. In the example shown, the database 44 stores a plurality of records $200_1$-$200_k$ each associated with a respective customer (such as customer 17) or group of customers (such as XYZ Corp 11 or the Smith Family 21).

Although database 44 is depicted in FIG. 1 as being one component, the database 44 may be distributed in nature. For example, the database 44 can have portions of its content stored in different data storage media possibly located in different network components of the communications network 10.

In the embodiment shown, record $200_2$ is associated with customer 17, record $200_3$ is associated with XYZ Corp 11 and record $200_4$ is associated with the Smith Family 21. Each of the records $200_1$-$200_k$ includes an entry for each of the communication devices associated with the customer or group of customers. As such, record $200_2$, includes two entries $250_1$ and $250_2$; with the first entry $250_1$ being associated with communication device 25 and the second entry $250_2$ being associated with communication device 27. Likewise, record $200_3$, includes two entries $252_1$ and $252_2$, with the first entry $252_1$ being associated with communication device 18 and the second entry $252_2$ being associated with communication device 19. In addition, record $200_4$, includes four entries $254_1$, $254_2$, $254_3$ and $254_4$; each being respectively associated with the communication devices 20, 22, 24 and 26.

For the purposes of the present description, each of the records $200_1$-$200_k$ includes subscriber identification information 202, at least one network identifier 204 associated with one or more communication devices included within the record, calling party identifier information 206 and call processing information 208.

In the case where multiple communication devices are associated with a common network identifier 204 (as is the case for records $200_3$ and $200_4$), each of the entries within those records also include user identification information 210 and device identification information 212, for enabling each of the individual communication devices to be identified. Each of the items of information stored in the records $200_1$-$200_k$ will now be described in more detail below.

The subscriber identification information 202 is information suitable for identifying the subscriber, or subscriber group, associated with the record. For instance, the subscriber identification information 202 may include an account number, a billing name and/or an address, among other types of subscriber identifier information known in the art. (The subscriber ID info 202 may also be a telephone number, or any other identifier included within the network identifier information 204).

The network identifier 204 is a unique identifier that is associated with one or more communication devices within each record $200_1$-$200_k$ (i.e. registered under a single subscriber account), such that the call processing entity 38 can identify when a call is originating from, or destined for a given communication device. The network identifier 204 can be a telephone number identifying a telephone line associated with a POTS communication device, an electronic serial number (ESN) and/or telephone number associated with a wireless communication device, or an IP address and telephone number (and/or another Uniform Resource Identifier (URI) such as a Session Initiation Protocol (SIP URI)) used by a VoIP phone, an ATA-equipped POTS phone, or a softphone.

In the non-limiting embodiment shown in FIG. 2, a separate network identifier 204 is associated with each of the communication devices 25 and 27 within record $200_2$. Whereas, in the case of records $200_3$ and $200_4$, a single network identifier is associated with a group of communication devices. More specifically, in the case of record $200_3$ a single network identifier 204, which is shown as being a telephone number, is associated with both of communication devices 18 and 19, and in the case of record $200_4$, a single network identifier 204, which is also shown as being a telephone number, is associated with all of communication devices 20, 22, 24 and 26.

The calling party identifier information 206 is information associated with one or more communication devices that can be provided to called parties when a communication device associated with that calling party identifier information 206 originates an outgoing call. The calling party identifier information 206 can take on a variety of forms without departing from the spirit of the present invention. For example, the calling party identifier 206 can be any one of a CID (caller identification), CNID (caller number identification) or CLID (calling line identification), which are known in the art. As such, the calling party identifier information 206 can be a phone number associated with any one of the communication devices in the set of communication devices or could be the name of a customer using one or more of the communication devices in the set of communication devices. In yet a further alternative, the calling party identifier information 206 could be the name of the group of customers associated with a set of communication devices, such as "The Smith Family", or the name of a business associated with a set of communication devices, such as "XYZ Corp".

The calling party identifier information 206 can be associated with a single communication device, or the calling party identifier information 206 can be common to a set of communication devices. In the case of record $200_2$, separate calling party identifier information 206 is associated with each of the communication devices 25 and 27. Whereas, in the case of records $200_3$ and $200_4$, common calling party identifier information 206 is associated with a group of communication devices. In record $200_3$ common calling party identifier information 206 (which is the name of the small business "XYZ Corp") is associated with both of communication devices 18 and 19, and in the case of record $200_4$, common calling party identifier information 206 (which is the name of the family "The Smith Family") is associated with all of communication devices 20, 22, 24 and 26.

The manner in which the processing entity 38 processes outgoing calls from a communication device that has calling party identifier information 206 that is common with at least one other communication device is described in more detail in co-pending patent application having serial number PCT/CA2007/002365 filed on Dec. 28, 2007, the contents of which are incorporated herein by reference.

As mentioned above, in the case where a common network identifier 204 is associated with multiple communication devices, such as in the case of records $200_3$ and $200_4$, the entries $252_1$, $252_2$, $254_1$ $254_2$ $254_3$ $254_4$ associated with those communication devices further include user identification information 210 and device identification information 212.

The user identification information 210, may include, for instance, a name of the user associated with a given communication device, such as "Barb", "Bob", or "Billy", or the name given to the phone, such as "home phone". Alternatively, the user identification information 210 could be an identity number or code, and/or other information associated with the identity of the user of the given communication device.

The device identification information 212 directly or indirectly identifies one or more of the communication devices associated with that subscriber group, such that a call originating from, or destined for that specific communication device, can be properly routed. In order to reach or be reached by the call processing entity 38 over the communications network 10, each of the communication devices 18, 19, 20, 22, 24 and 26 is directly or indirectly identified by a device identifier included in the device identification information 212. The device identifier identifying each of the communication devices 18, 19, 20, 22, 24 and 26 may take on various forms depending on that communication device's type. For example: for the communication device 26, which, in this case, is a wired POTS phone, the device identifier may include a telephone number identifying a telephone line to which the wired POTS phone 26 is connected; for the communication devices 20, 22, 24 and 19, which are wireless phones, the device identifier may include an electronic serial number (ESN), an extension ESN, and/or a unique telephone number associated with the wireless phones 20, 22, 24 and 19; for the communication device 18, which is a VoIP phone, ATA-equipped POTS phone, or softphone, the device identifier may include an IP address and/or a telephone number (and/or another URI such as a SIP URI) associated with the VoIP phone, ATA-equipped POTS phone, or softphone. It will be recognized that the device identifier information 212 identifying a given communication device may take on other forms (e.g., Electronic Numbering (ENUM) information) in other cases.

In the case of communication devices 18 and 19, which are associated with a common telephony identifier (i.e. network identifier 204), callers who desire to reach customers 12 or 13 can do so by placing calls to the common telephony identifier 204 (which in this case is (555) 555-1234) without knowing the device identifier 212 associated with either of the communication devices 18 and 19. In that sense, the device identifier associated with each of the communication devices 18 and 19 can be considered as a "hidden" identifier (e.g., a hidden telephone number) that is used by the call processing entity 38 to communicate with those communication devices. That is, the device identifier 212 associated with each of the communication devices 18 and 19 need not be known by callers that wish to call the customers 12 or 13 or even by customers 12 and 13 themselves. Rather, the customers 12 and 13 may provide only the common network identifier number 204, (which in this case is (555) 555-1234) to individuals (e.g., friends, colleagues, business contacts or other acquaintances) who may then proceed to call any one of customers 12 or 13 using that supplied telephone number. As discussed in co-pending application PCT/CA2007/002363 filed on Dec. 27, 2007, the call processing entity 38 can determine, based on information regarding an origin of a given call placed to the telephone number (555) 555-1234, to which of customers 12 or 13 the call is intended and can then proceed to route the call accordingly, for instance, by directing the call to one or more of the communication devices 18 and 19 using the (hidden) device identifier associated with each of these communication devices.

Each entry $250_1$, $250_2$ $252_1$, $252_2$ $254_1$, $254_2$, $254_3$, and $254_4$, further includes call-processing information 208 for advising the processing entity 38 how to process incoming calls, outgoing calls and calls in progress that are associated with each of the communication devices 18, 19, 20, 22, 24, 25, 26 and 27.

The call-processing information 208 associated with a given communication device can take on many forms. For example, the call processing information 208 can include a set of rules to be followed by the call processing entity 38. In some embodiments, the call processing information 208 associated with each of the communication devices may be configured by one or more users of the communication device. In the embodiment shown, the call processing information 208 is indicative of telephony features associated with each communication device. These telephony features can be features that are subscribed to by a user of the communication device or that are available to all communication devices being handled by a given service provider.

As will be described below, most telephony service providers provide a plurality of telephony services that will affect the way either an incoming communication, an outgoing communication, or a communication in progress is handled. As such, the call processing information 208 that is stored in the database 44 is used by the call processing entity 38 during the processing of calls, or during the processing of other communications such as text messages, in order to apply one or more appropriate telephony features.

Subscription to different telephony features may be completely independent from one customer to another or from one communication device to another, and there is no restriction on a number or combination of features that may be subscribed to by any one customer. In some cases, a customer may not subscribe to any telephony features, while in other cases a customer may subscribe to all available telephony features. Also, in some cases, one or more telephony features may be subscribed to without having to pay for these one or more features, which may be provided as default or standard features.

Some non-limiting examples of available telephony features include:
 a call forwarding feature, whereby every incoming call destined for a given communication device associated to a customer is to be forwarded to a second communication device associated to the customer;
 a call transferring feature, whereby a call in progress at a given communication device can be transferred by a user of the given communication device to another communication device.
 a selective call forwarding feature, whereby incoming calls that are originated by one or more communication devices associated with a selected given party, and destined for a communication device associated with the customer are to be forwarded to a second communication device associated with the customer.
 a no-answer call forwarding feature, whereby an incoming call destined for a first communication device associated with the customer is to be forwarded to a second communication device associated with the customer if the incoming call is not answered on the first communication device within a predetermined period of time (e.g., ringing cycle);
 a "find me/follow me" (FM/FM) call forwarding feature, whereby an incoming call is to be forwarded to a plurality of communication devices associated with the customer either simultaneously or sequentially (e.g., until the call is answered or until all the communication devices have been used and the call remains unanswered, in which case the call can be forwarded to a voicemail system);
 a first distinctive ringing feature, whereby incoming calls destined for a communication device are to be announced by different audio signals (e.g., ring tones or songs) produced by the communication device when they originate from communication devices associated with different calling parties;
 a selective call rejection feature, whereby an incoming call originated by any of one or more communication entities each associated with a given party and destined for a communication device associated with the customer is prevented from reaching the communication device associated with the customer;
 a selective call acceptance feature, whereby only an incoming call originated by a communication device associated with a given party and destined for a communication device associated with the customer is allowed to reach the communication device associated with the customer;

a call waiting feature, whereby a communication device participating in a call in progress produces a notification for the user of the communication device of an incoming call destined for the communication device;

a calling line identification (CLID) displaying feature, whereby CLID information associated with a communication device originating a call that is destined for a communication device associated with the customer is displayed by the communication device associated with the customer;

a CLID blocking feature, whereby CLID information (e.g., a telephone number and/or a name or other party identifier) associated with a communication device with which the customer originates an outgoing call destined for a communication device belonging to another party is not provided to the communication device belonging to the other party; and a speed calling feature, whereby an outgoing call destined for any of one or more communication devices that are associated with the same or different predetermined party can be originated by inputting into a communication device associated with the customer a specific code (e.g., a one or two digit code) that is shorter than the telephone number associated with the communication device for which the outgoing call is destined.

A customer who subscribes to one or more of the telephony features listed above is generally able to configure the manner in which the telephony features work. This configuration can be done by interacting with a representative, an interactive voice response (IVR) unit, or a data network site (e.g., a web site) associated with a provider of the features.

It is to be understood that the above examples of telephony features are presented for illustrative purposes only and are not to be considered limiting in any respect as various other telephony features are, or may become, available.

Generally, the call processing information 208 associated with each of the communication devices is indicative of one or more operations to be performed by the call processing entity 38 to process calls intended for or originated by that identity. It is also to be understood that, in some embodiments, the call processing information 208 associated with any one of the communication devices shown, may not relate to any particular telephony feature.

In the embodiment shown in FIG. 2, each of the communication devices 27, 18, 19, 20, 22, 24 and 26 subscribes to a "call display" feature, and a "call transfer feature". As such, whenever one of these communication devices receives an incoming call, calling party identifier information associated with the calling party communication device is provided to the called communication device. In addition, the "call transfer" feature allows a communication device to transfer a call that is in progress to another communication device.

In accordance with the present invention, the communication devices 18, 19, 20, 22, 24, 25, 26 and 27 also subscribe to a "calling line modification" feature.

It should be appreciated that the "call display", the "call transfer" and the "calling line modification" feature can all be features that are subscribed to by the communication devices, or they can be complimentary features that are provided to the communication devices by the service provider without requiring the customer to subscribe to these features.

The "calling line modification" feature is a telephony feature that enables a communication device to modify the calling party identifier information associated with a calling party when a telephony communication involving that calling party is being transferred. For example, assume that customer 17, "Granny", uses communication device 27 (which is her cell phone) to call customer 15, "Bob", on communication device 22 (which is his cell phone 22). As such, when Bob 15 receives the call from Granny 17 on his cell phone 22, the calling party identifier information 206 associated with Granny's cell phone 27 is displayed to Bob 15. In accordance with the present example, the calling party identifier information 206 associated with communication device 27 is phone number 555-555-9876. As such, prior to accepting the call, Bob 15 may recognize the calling party identifier information 555-555-9876 as associated to Granny 17, and subsequently accept the call from Granny 17. Then Bob 15 decides that he wants to transfer the call to customer 16, "Billy". However, Bob 15 knows that Billy 16 may not necessarily recognize the phone number 555-555-9876 as being associated to Granny 17. As such, by using the calling line modification feature, Bob can cause Billy to receive different calling party identifier information when Billy receives the transferred call. In a non-limiting example, Bob may modify the calling party identifier information such that instead of receiving Granny's phone number, Billy will receive modified calling party identifier information that may be indicative of Granny's name, such as "Granny". As will be described in more detail below the modified calling party identifier information can take on a variety of different formats. By receiving the modified calling party identifier information, Billy will have a higher likelihood of recognizing the origin of the telephony communication, and be more likely to accept the call.

It should be appreciated that the modified calling party identifier information is simply temporary calling party identifier information that is associated to the transferred call only. Assuming that Billy did not accept the call, such that the telephony communication is terminated, the next time that Granny 17 makes an outgoing call, the called party will receive her original calling party identifier information 206 that is stored in database 44, and will not receive the modified calling party identifier information.

As mentioned above, it is the call processing entity 38 that is operative to interact with the switching/routing entity 36 and the database 44 in order to effect various call processing operations when a communication device (such as any of the communication devices 18, 19, 20, 22, 24, 25, 26 and 27) connected to the switching/routing entity 36 receives an incoming call, originates an outgoing call, or participates in a call in progress. More particularly, the call processing entity 38 is operative to process calls arriving at the switching/routing entity 36.

The processing of a given call by the call processing entity 38 can be viewed as the call processing entity 38 performing one or more operations to process the given call. In this embodiment, the call processing entity 38 is operative to process calls in accordance with a set of rules. The set of rules may be stored in a computer readable storage medium that can be accessed by the call processing entity 38. Each rule may be defined by a condition, an operation to be performed if the condition is satisfied for a given call, and an operation to be performed if the condition is not satisfied for a given call (e.g., <condition> <operation to be performed if condition is satisfied> <operation to be performed if condition is not satisfied>). For a given rule, the condition may be defined in terms of one or more characteristics of a call. Examples of characteristics of a call are: its origin, which may be expressed, for instance, as a telephone number or other identifier (e.g., an IP address or SIP URI) associated with a communication device that originated the call; its intended destination, which may be expressed, for instance, as a telephone number or other identifier (e.g., an IP address or SIP URI) associated with a communication device for which the call is destined; and a time at which it was originated (e.g., a date, hour, minute, etc.). For a given rule, the condition may also be defined in terms of call processing information (in this case, telephony feature information) that is included in the records $200_1$-$200_k$ of the database 44. For a given rule, the operations to be performed based on whether the condition is satisfied depends on the nature of the given rule (e.g., route a call to its intended destination, forward a call in accordance with a call forwarding feature, cause production of an audio signal in accordance with a distinctive ringing feature, prevent establishment of an outgoing call in accordance with an outgoing call barring feature, etc.). The call processing entity 38 comprises suitable hardware, firmware, software, control logic, or a combination thereof for implementing its functionality. In accordance with a non-limiting example of implementation, the call processing entity 38 can be a softswitch, or any other type of IP application server.

In the embodiment shown, the call processing entity 38 includes a plurality of functional units, including an input/output unit 40 and a processing unit 42, whose functionality will be described in further detail below.

In accordance with a non-limiting embodiment, it is the call processing entity 38 that is operative for implementing the calling line modification feature contemplated herein. As shown, the call processing entity 38 is communicatively coupled to the switching/routing entity 36, and the database 44. As will be further detailed later on, the call processing entity 38 is operative for accessing the records $200_1$ to $200_k$, within the database 44 in order to place a call by or transfer a call to a communication device (or issue an SMS or other text message). On the basis of the information within the database 44, the call processing entity 38 can process a call, or other type of communication, in accordance with the call processing information. In the case where a communication device, or a group that subscribes to a calling line modification feature, the call processing entity 38 can cause modified calling party identifier information associated with a calling party communication device to be generated and temporarily stored such that the modified calling party identifier information can be provided to a communication device to which the telephony communication is being transferred.

In some embodiments, the switching/routing entity 36, the call processing entity 38 and the database 44 may reside in a common network element of the communications network 10. In such embodiments, links between these components may be physical (i.e., wired or wireless) links or logical links. In other embodiments, different ones of the switching/routing entity 36, the call processing entity 38 and the database 44 may reside in different or common network elements of the communications network 10 that are interconnected via one or more physical links and possibly other elements (e.g., gateways) of the communications network 10. Also, although it is depicted in FIGS. 1 and 2 as being one component, the database 44 may be distributed in nature, i.e., it can have portions of its content stored in different memory units possibly located in different network elements of the communications network 10. For example, the call processing information 208 shown may be stored in a memory unit dedicated to storing this information and distinct from a memory unit that stores other contents of the database 44 shown in FIG. 2.

Figure 3:
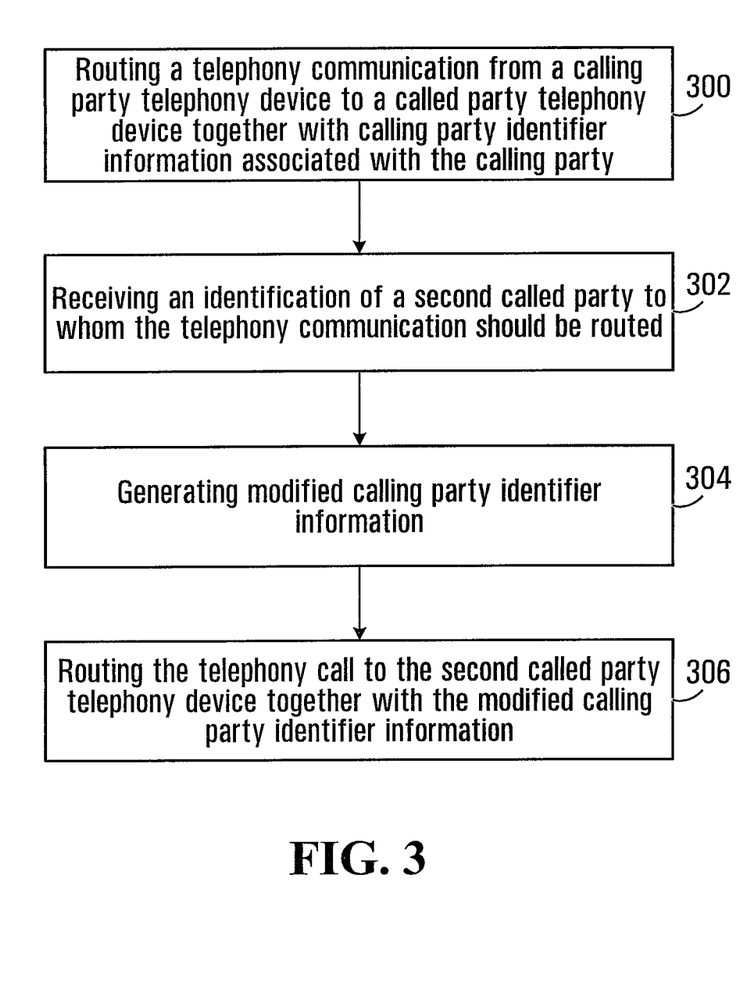
FIG. 3 shows a method for modifying calling party identification information associated with a telephony communication, in accordance with a non-limiting embodiment of the present invention.

The interaction between the switching/routing entity 36, the call processing entity 38, and the database 44, for implementing the calling line modification feature will now be described in more detail with reference to the flow chart shown in FIG. 3.

Step 300

Firstly, at step 300, the call processing entity 38 causes a telephony communication from a calling party communication device to be routed to a called party communication device together with calling party identifier information associated with the calling party.

More specifically, the call processing entity 38 receives, over a network connection, an indication of an attempt to place a call by a calling communication device. Although the telephony communication will be described as a telephone call for the purposes of this example, it should be appreciated that the same procedure could take place in the case where the telephony communication is an instant message, an SMS, a video communication, a multimedia communication or any other type of telephony communication.

Let us continue with the example described above wherein customer 17, "Granny", is using her cell phone (communication device 27) in order to attempt to place a call to customer 15, "Bob", on Bob's cell phone (communication device 22).

When Granny 17 originates the outgoing call, the call processing entity 38 will receive from the switching/routing entity 36 an indication that communication device 27 is attempting to make a call. In general, the indication of an attempt to make a call is firstly received at the switching routing entity 36 (via the gateway 32 in the case of the wireless communication device 27), and is passed to the call processing entity 38 such that the call processing entity 38 can process the intended call in the appropriate way. In a specific example of implementation, the indication of the attempt to place an outgoing call is received at the input/output unit 40 of the call processing entity 38.

When routing a call, the call processing entity 38 receives an indication of the telephony (network) identifier 204 associated with the calling party communication device that is placing the call. The call processing entity 38 also receives destination information indicative of the called party communication device to which the call should be routed. On the basis of this information, the call processing entity 38 can access the call processing information 208 associated with the calling party communication device and the called party communication device, for determining how to handle/process the call.

Continuing with the example started above, in the case where Granny 17 is calling Bob 15, the call processing entity 38 receives the network identifier 204 associated with Granny's calling party communication device 27 (which is the telephone number 555-555-9876). The call processing entity 38 also receives destination information associated with Bob's cell phone 22. For the sake of example, the destination information provided by Granny 17 is the telephony identifier 204 (telephone number 555-555-1111) that is associated with the Smith Family. The manner in which the call processing entity 38 determines that a call for destination information 555-555-1111 is intended for Bob's cell phone 22 (as opposed to the other three communication devices that are associated with that same network identifier 204) is explained in more detail in co-pending application PCT/CA2007/002363 filed on Dec. 27, 2007.

It should be appreciated that the call destination information that is provided to the call processing entity can be any identifier associated with the called communication device. For example, the call destination information can be a phone number, an IP address or a name, among other possibilities. In the case where the call destination information is a phone number, this call destination information can be provided via DTMF digits, CDMA or GSM packets or digital packets that are entered via a numeric keypad, into the communication device. In the case where the call destination information is an IP address, this information can be entered into the calling party communication device via a keypad, or via speech signals. Likewise, in the case where the call destination information is the name of the party being called, it can be entered into the communication device via speech signals such that the user simply needs to utter the name of the called party into the communication device. It should be appreciated that in the case where the call destination information is a phone number, this call destination information could also be entered into the communication device via speech signals.

On the basis of the network identifier 204 associated with the calling party communication device and the network identifier 204 of the called party communication device, the processing entity 38 can route the call from the calling party (Granny 17) to the called party (Bob). More specifically, the call processing entity 38 can access call processing information 208 associated with both the calling party communication device 27 and the called party communication device 22 such that it knows how to process calls originating from Granny's cell phone 27 and destined for Bob's cell phone 22.

For example, upon receipt of the telephony identifier 204 associated with Granny's cell phone (the calling party communication device 27), the call processing entity 38 will access entry $250_2$ in the database 44 so as to obtain the calling party identifier information 206 associated with Granny's cell phone (the calling party communication device 27). Then, on the basis of determining that called destination is associated with Bob's cell phone (called party communication device 22), the processing entity 38 will access the entry $254_2$ associated with this communication device in order to consult the call processing information 208 associated with Bob's cell phone (called party communication device 22). By consulting the call processing information 208 associated with Bob's cell phone (called party communication device 22), the processing entity 38 will be aware that Bob's cell phone (called party communication device 22) subscribes to the "call display" feature, the "call transfer" feature and the "calling line modification" feature. As such, when routing the telephony communication from Granny's cell phone (the calling party communication device 27) to Bob's cell phone (called party communication device 22), the processing unit 38 will ensure to include the calling party identifier information 206 associated to Granny's cell phone (the calling party communication device 27).

As such, the call processing entity 38 routes the telephony communication from Granny's cell phone (calling party communication device 27) to Bob's cell phone (called party communication device 22) together with the calling party identifier information 206 (555-555-9876) associated with Granny's cell phone (the calling party communication device 27).

Step 302

Once the call has been established between Granny's cell phone (calling party communication device 27) and Bob's cell phone (called party communication device 22), it may be the case that Bob 15 then decides that to the call should be transferred to Billy (customer 16). As such, at step 302, the call processing entity 38 receives an identification from Bob 15, via his cell phone (called party communication device 22), of a second called party to whom the telephony communication should be routed (namely Billy's cell phone, which is communication device 24).

As used herein, the term "second called party" refers to the party to whom a call is transferred. The call may be transferred to the second called party due to a decision by the first called party, or the call may be transferred to the second called party due to the fact that the calling party had originally intended to call the second called party, but the call was answered by the first called party. As such, the second called party may have been the intended destination party when the calling party initiated the call.

Keeping with the specific example described above, the call processing entity 38 receives from Bob 15, via communication device 22, an indication that the ongoing telephony communication established with Granny 17 should be transferred to Billy 16, at communication device 24 (which is Billy's cell phone).

The indication that the telephony communication should be transferred to Billy's cell phone (communication device 24) can be provided in a variety of ways. For example, Bob 15 can first provide an indication that the call should be transferred. This can be done by pressing a key combination, such as "*39", that is dedicated to indicating that a call should be transferred, or by Bob providing a spoken utterance such as "transfer" into the communication device 22. In yet a further alternative, the communication device 22 may include a dedicated button that can be pressed for providing the indication that the call should be transferred. The call processing entity 38 is operative to receive and interpret this indication via either DTMF tones, or a speech signal, among other possibilities. Based on receipt of the indication that the call should be transferred, the call processing entity 38 then waits to receive destination information indicative of the communication device to which the telephony communication should be transferred. The call processing entity 38 can either prompt the user to enter the destination information for the second called party, or can simply wait for the destination information to be entered.

The call destination information can be any identifier associated with the communication device to which the call should be transferred. (i.e. the second called party). For example, the call destination information can be a phone number, an IP address or a name, among other possibilities. In the case where the call destination information is a phone number, this call destination information can be DTMF digits, CDMA or GSM packets or digital packets that are entered via a numeric keypad, among other possibilities, into the communication device. In the case where the call destination information is an IP address, this information can be entered into the calling party communication device via a keypad, or via speech signals. Likewise, in the case where the call destination information is the name of the party to whom the call should be transferred, it can be entered into the communication device via speech signals such that the user simply needs to utter the name of the second called party into the communication device. It should be appreciated that in the case where the call destination information is a phone number, this call destination information could also be entered into the communication device via speech signals.

Therefore, continuing with the example started above, in the case where Bob 15 desires to transfer the call received from Granny 17 to Billy 16, Bob 15 first provides an indication that the call should be transferred, such as by uttering the word "transfer", into his cell phone (communication device 22). Once Bob 15 has provided the indication that the call should be transferred, Bob 15 then provides the destination information associated with Billy's cell phone (communication device 24). For the purposes of the present example, Bob 15 provides the destination information in the form of a voice signal uttered into his communication device 22, by saying "Billy".

Upon receipt of this voice signal, the call processing entity 38 may then refer to record $200_4$ within database 44, for determining that "Billy" is included within the same family subscription record as Bob. The call processing entity 38 can obtain the device ID info for Billy's communication device from record $254_3$ in order to be able to transfer the call from Bob's cell phone (called party communication device 22) to Billy's cell phone (second called party communication device 24).

In the case, for example, where an entry for "Billy" was not included within the same family subscription record as Bob, the call processing entity 38 may access a network address book associated with Bob 15 or the Smith Family 21, for determining the communication device associated with "Billy". In certain circumstances, upon determination of a communication device associated with the voice utterance indicative of destination information, the call processing entity 38 may request confirmation that the determined communication device to which the call should be transferred is the correct communication device. For example, in the case where Bob 15 uttered "Billy" as the destination information, the call processing entity 38 may then ask Bob 15 to confirm that the call should be transferred to "Billy Smith". This verification question can be provided to Bob 15 via text displayed on a screen of Bob's cell phone (communication device 22), or via synthesized speech that is played at Bob's cell phone (communication device 22).

Step 304

At step 304, given that Bob 15 subscribes to the "calling line modification" feature, the processing unit 42 of the call processing entity 38 generates modified calling party identifier information to be sent to Billy 16 when the call is transferred. Assuming that Bob 15 did not subscribe to the "calling line modification" feature, then when the call is transferred to Billy 16, Billy 16 would simply receive the same calling party identifier information that Bob 15 had received, namely the calling party identifier information 206 associated with Granny's cell phone (calling party communication device 27), which for the purposes of this example is phone number (555-555-9876).

As will be described in more detail below, the call processing entity 38 can generate the modified calling party identifier information on the basis of information provided by the first called party communication device (which in this case is Bob's cell phone), or can generate the modified calling party identifier information based on predefined rules and/or program instructions.

The "calling line modification" feature allows the calling party identifier associated with the original calling party communication device to be modified. More specifically, the original calling party identifier can be modified in the following ways:

modified to reflect the customer who is transferring the call. In this manner a code indicative of the person transferring the call could be added to the original calling party identifier, as well as an indication that the call is being transferred. For example, assuming that Bob 15 is transferring the call from Granny 17 to Billy 16, the original calling party identifier could be modified in the following way:
original calling party identifier: 555-555-9876,
modified calling party identifier: BOB FW: 555-555-9876 modified to reflect both the customer who is transferring the call and the customer who is receiving the transferred call. In this manner a code indicative of the person transferring the call as well as a code indicative of the person the call is intended for could be added to the original calling party identifier. For example, assuming that Bob 15 is transferring the call from Granny 17 to Billy 16, the original calling party identifier could be modified in the following way:
original calling party identifier: 555-555-9876,
modified calling party identifier: BOB FW BIL: 555-555-9876, modified to reflect who the transferred call is intended for. In this manner a code indicative of the person the call is intended for could be added to the original calling party identifier. For example, assuming that Bob 15 is transferring the call from Granny 17 to Billy 16, the original calling party identifier could be modified in the following way:
original calling party identifier: 555-555-9876,
modified calling party identifier: FOR BIL: 555-555-9876, modified to reflect the urgency of a telephony communication. In this manner a code or symbol indicative that the call is urgent could be added to the original calling party identifier. For example, the original calling party identifier could be modified in the following way:
original calling party identifier: 555-555-9876,
modified calling party identifier: !! 555-555-9876, OR
modified calling party identifier: URG: 555-555-9876 modified to make the original calling party more identifiable. In this manner, instead of information being added to the calling party identifier, the original calling party identifier could be modified or replaced. For example, assuming that Bob 15 is transferring the call from Granny 17 to Billy 16, the original calling party identifier could be modified in the following way:
original calling party identifier: 555-555-9876,
modified calling party identifier: GRANNY modified to complete the calling party identifier. In this manner, assuming that no calling party identifier is associated with the original calling party, such as in the case where the calling party has blocked their calling party identifier, then the customer who is transferring the call can change the original calling party identifier such it provides more descriptive or contextual information. For example, the original calling party identifier could be modified in the following way:
original calling party identifier: private OR blocked OR unknown
modified calling party identifier: GRANNY It is to be understood that the above examples of ways in which the original calling party identifier information can be modified are presented for illustrative purposes only and are not to be considered limiting in any respect as various other manners of modifying the calling party identifier information would be apparent to a person of skill in the art.

As mentioned above, the call processing entity 38 can generate the modified calling party identifier information in at least two different ways. Firstly, the call processing entity 38 can generate the modified calling party identifier information, at least in part, on the basis of information related to or provided by the customer who is transferring the call. Alternatively, the call processing entity 38 can automatically generate the modified calling party identifier information based on a set of rules and/or program instructions. Each of these options will be described in more detail below.

In the first scenario, the call processing entity 38 generates the modified calling party identifier information at least in part on the basis of information related to or provided by the customer who is transferring the telephony communication. This information can be provided to the call processing entity 38 directly following the entry of the destination information indicative of the communication device to which the call should be transferred. Or, the information can be provided to the call processing entity 38 following an indication that the customer transferring the call wants the calling party identifier information to be modified. In this respect, in order to cause the calling party identifier information to be modified, the customer transferring the call must provide an indication that the calling party identifier information should be modified. Otherwise, the call processing entity 38 simply transfers the call together with the original calling party identifier information.

The indication that the customer desires the calling party identifier information to be modified can be provided by pressing a specific key or combination of keys on a keypad of the communication device, or this can be done by uttering a voice signal, such as "modify" into the communication device.

Once the call processing entity 38 has received an indication that the customer would like to modify the calling party identifier information, the call processing entity 38 then waits to receive information as to how the customer would like to modify the calling party identifier information. This information can be provided to the call processing entity 38 via DTMF digits, CDMA or GSM packets or digital packets, that are entered via a numeric keypad on the communication device. Or, the modification information can be entered into the communication device via speech signals such that the user simply needs to utter the information that should modify the calling party identifier information.

Keeping with the example described above, in the case where Bob 15 would like to transfer a call from Granny 17 to Billy 16, once Bob 15 has provided an indication that the call should be transferred and destination information indicative that the call should be transferred to Billy 16, then Bob 15 could cause the calling party identifier information associated with Granny's cell phone (calling party communication device 27) to be modified. For example, Bob 15 may then utter the word "modify" into his cell phone (first called communication device 22), which would alert the call processing entity 38 to the fact that the Bob 15 wants to modify the calling party identifier information associated with Granny's cell phone (calling party communication device 27). At this stage, the call processing entity 38 may display the calling party identifier information associated with Granny's cell phone (calling party communication device 27) on a display screen of Bob's cell (first called communication device 22) in a format that can be modified. Bob 15 can then use the keypad of his cell phone (first called communication device 22) in order to change or add to the calling party identifier information. In this manner, Bob 15 can alter the calling party identifier information in such a way that Bob 15 specifies exactly how the modified calling party identifier information appears to Billy 16, when the call is transferred.

In an alternative embodiment, Bob 15 can use speech signals in order to provide modification information to the call processing entity 38 for modifying the calling party identifier information.

In certain circumstances the modification information that is received from the customer who is transferring the call may be received in response to prompts provided by the call processing entity 38. These prompts may be provided in text format on a display screen of the customer's communication device, or these prompts may be provided in the form of synthesized speech signals received at the customer's communication device. For example, the prompts may ask questions such as "Is this communication urgent?", "Who is this communication destined for?", "would you like your name to appear?" or "would you like the name of the original calling party to appear?", among other possible questions. Based on the information received in response to these prompted questions, the call processing entity 38 can then generate the modified calling party identifier information.

It should be appreciated that in the case where the call processing entity 38 receives modification information from the customer who is transferring the call, this information can be entered either before or after the destination information indicative of the communication device to which the telephony communication should be transferred is provided.

In the second scenario, the call processing entity 38 generates the modified calling party identifier information at least in party on the basis of a set of rules and/or program instructions. The rules or program instructions can either be pre-programmed into the "calling line modification" feature to which a customer subscribes, or the rules and/or program instructions can be set up and configured by the customer upon initialization of the feature, and/or at another desirable time.

Some non-limiting examples of rules that could be used by the call processing entity 38 in order to generate the modified calling party identifier information include:

1) if the calling party identifier information is a phone number, and the called party communication device includes a name in their address book associated with that calling party phone number, when the call is transferred the calling party identifier information could be modified such that it is the name associated with the phone number (in the address book) instead of the phone number itself.

2) whenever a customer transfers a telephony communication, modified calling party identification information should be generated, and take on the form of: [TWO LETTER CODE ASSOCIATED TO THE TRANSFERRING CUSTOMER] FW [TWO LETTER CODE ASSOCIATED TO THE RECEIVING CUSTOMER]: [ORIGINAL CALLING PARTY IDENTIFIER INFORMATION]. These two letter codes can be pre-established codes, or can simply be the first two letters, or initials, of the customer's user name. This information can all be obtained by the call processing entity 38 based on the information contained in the database 44, and the destination information for the customer to whom the call is being transferred.

Keeping with the example where Bob 15 is transferring a call from Granny 17 to Billy 16, in the situation where the call processing entity 38 uses a set of rules to automatically generate modified calling party identifier information, all Bob 15 needs to do is say "transfer to Billy" or enter instructions to that effect, into his communication device 22. Based on this information, the call processing entity 38 has received: 1) an indication that the call should be transferred; 2) destination information in the form of the name of the person to whom the call should be transferred (namely Billy); and 3) sufficient information to generate modified calling party identifier information based on a set of rules. As such, the modified calling party identifier information may be: BO FW BI: GRANNY (assuming that granny is in Bob's network address book). As such, the customer transferring the call (namely Bob 15) is only required to enter very little information in order for the call to be transferred to Billy along with modified calling party identifier information.

It is to be understood that these examples of rules that can be used to automatically generate a modified calling party identifier information are presented for illustrative purposes only and are not to be considered limiting in any respect as various other rules could be envisaged.

Once the modified calling party identifier information has been generated by the call processing entity 38, it may be temporarily stored in a memory unit (not shown) such that it is associated with the ongoing telephony communication that is being transferred. It should be appreciated that the modified calling party identifier information does not over-write the calling party identifier information associated with the calling party, that is stored in database 44. Instead, the modified calling party identifier information is only temporarily stored in a memory unit such that it is associated with the ongoing telephony communication. This modified calling party identifier information will be communicated to the communication device to which the call should be transferred, and then be erased.

Step 306

Finally, at step 306, the call processing entity 36 causes the telephony communication to be transferred to a second called party communication device, together with the modified calling party identifier information. This is done by transferring the call through the switching/routing entity 36 to the second called party communication device.

An additional example will be described below in order to further exemplify the use of the "calling line modification" feature according to the present invention.

Situational Example

Assume that customer 14, "Barb", wants to call customer 12, "Janet", at XYZ Corp. 11. In order to do so, Barb 14 uses her cell phone (communication device 20) to initiate the call, and calls the common telephone number 514-666-4321 associated with XYZ Corp 11.

The call processing entity 38 receives this call request, which includes the network identifier 204 and device ID information 212 associated with the calling party communication device 20, as well as destination information specifying XYZ Corp 11. The destination information associated with XYZ Corp 11 can be the network identifier 204 associated with XYZ Corp 11, which in the example shown in FIG. 2 is the phone number 555-555-1234. The call processing entity 38 then accesses database 44 in order to determine the call processing information associated with the calling party communication device 20. By so doing, the call processing entity 38 determines that there is a common calling party identifier 206 associated with Barb's cell phone 20, namely: "The Smith Family". In addition, call processing entity 38 realizes that the common telephony identifier 555-555-1234 for XYZ Corp 11 is associated with multiple communication devices.

Based on the call processing information associated with XYZ Corp 11, the call processing entity 38 can handle the call in a variety of ways. For example, the call processing entity 38 can cause all of the communication devices associated with telephony identifier 555-555-1234 to ring simultaneously, or based on past calling history, the call processing entity 38 determines that calls originating from communication devices belonging to "the Smith Family" are generally intended for customer 13, "Joe". The manner in which this is done is described in more detail in co-pending application PCT/CA2007/002363 filed on Dec. 27, 2007.

For the purposes of this example, let us assume that the call from Barb 14 is routed to communication device 19 which is Joe's cell phone. More specifically, the call is routed to Joe 13 along with the calling party identifier information associated with Barb's cell phone (calling party communication device 20), which is "The Smith Family". As such, when the call is routed to Joe's communication device, Joe's cell phone (called party communication device 19) displays the calling party identifier "The Smith Family".

Let us assume that Joe 13 answers the call, but realizes after briefly talking to Barb, that Barb actually intended to talk to his colleague Janet 12. As such, he advises Barb 14 that he is going to transfer the call to Janet 12. At this point Joe 13 may put Barb 14 on hold (which can be done in a variety of different ways) and then takes the necessary steps to advise the call processing entity 38 that the call should be transferred. As described previously, Joe 13 will need to provide the call processing entity 38 with an indication that the call should be transferred and destination information associated with the communication device 18 to which the call should be transferred, which in this case will be Janet's VoIP phone (second called communication device 18).

When the call processing entity 38 receives an indication that the call should be transferred, the call processing entity 38 further determines based on the call processing information associated with Joe's cell phone (first called communication device 19), that this communication device subscribes to the "calling line modification" feature. As such, when Joe 13 transfers the call to Janet 12, Joe 13 can modify the original calling party identifier information provided, which was "The Smith Family", such that Janet 12 is provided with more descriptive information as to who is on the other end of the call.

In accordance with a non-limiting embodiment, before transferring the call, Joe 13 can modify the calling party identifier information so as to indicate that the call is being forwarded to Janet, and in order to better indicate who the originator of the call is. For example, Joe 13 can modify the calling party identifier information such that the modified calling party identifier information that is provided to Janet 12 takes the form: JO FW JA: BARB SMITH (i.e. Joe is forwarding a call from Barb to Janet).

While specific embodiments of the present invention have been described and illustrated above, it will be apparent to those skilled in the art that further modifications and variations can be made without departing from the scope of the invention as defined in the appended claims.

The invention claimed is:

1. A method, comprising:
   a. causing a telephony communication originating from a calling party communication device to be routed to a first called party communication device together with calling party identifier information associated with the calling party communication device;
   b. receiving an identification of a second called party communication device to which the telephony communication should be routed;
   c. generating modified calling party identifier information, via manual input by a user of the first called party communication device associated with the telephony communication on the basis of modification information obtained from the first called party communication device;
   d. causing the telephony communication to be routed to the second called party communication device together with the modified calling party identifier information,
   wherein the modified calling party identifier information comprises ID information associated with a user of the first called party communication device and ID information associated with a user of the second called party communication device, the first called party and the second called party being distinct parties.

2. A method as defined in claim 1, wherein both the first called party communication device and the second called party communication device belong to a group of at least two communication devices having a common telephony identifier.

3. A method as defined in claim 1, wherein the calling party identifier information is retrieved from a database on the basis of a telephony identifier associated with the calling party communication device, the database comprising a plurality of entries, each entry including;
 a. a telephony identifier associated with at least one communication device;
 b. calling party identifier information associated with the telephony identifier.

4. A method as defined in claim 3, further comprising temporarily storing the modified calling party identifier information in a memory unit.

5. A method as defined in claim 1, wherein the modification information received from the first called party communication device is derived from DTMF signals.

6. A method as defined in claim 1, wherein the modification information received from the first called party communication device is derived from voice information.

7. A method as defined in claim 1, wherein the modification information received from the first called party communication device is derived on the basis of a telephony identifier associated with said first called party communication device.

8. A method as defined in claim 1, wherein the modified calling party identifier information comprises information indicative of an importance level associated with the telephony communication.

9. A method as defined in claim 1, wherein the modified calling party identifier information includes additional information associated with the calling party communication device.

10. A method as defined in claim 2, wherein the telephony identifier is a telephone number.

11. A method as defined in claim 1, wherein the calling party identifier information comprises a telephone number of the calling party communication device.

12. A method as defined in claim 1, wherein the calling party identifier information comprises a name of a user associated with the calling party communication device.

13. A method as defined in claim 1, wherein the identification of a second called party communication device is received from a user of the first called party communication device.

14. A method as defined in claim 13, wherein the identification of a second called party communication device is received via dial tone signals.

15. A method as defined in claim 13, wherein the identification of a second called party communication device is received via a voice input.

16. A method as defined in claim 15, wherein the identification of a second called party communication device includes a name of a user associated with the second called party communication device.

17. A system comprising:
 a. a routing entity for routing a telephony communication from a calling party communication device to a first called party communication device together with calling party identifier information associated with the calling party communication device;
 b. a processing entity for:
  i. receiving an identification of a second called party communication device to which the telephony communication should be routed;
  ii. generating modified calling party identifier information, via manual input by a user of the first called party communication device associated with the telephony communication on the basis of modification information received from the first called party communication device,
  iii. causing said routing entity to route the telephony communication to the second called party communication device together with the modified calling party identifier information,
 wherein the modified calling party identifier information comprises ID information associated with a user of the first called party communication device and ID information associated with a user of the second called party communication device, the first called party and the second called party being distinct parties.

18. A system as defined in claim 17, further comprising a database, the database comprising a plurality of entries, each entry including:
 a. a telephony identifier associated with at least one communication device;
 b. calling party identifier information associated with the telephony identifier.

19. A system as defined in claim 18, Wherein each entry in said database further comprises call processing information.

20. A system as defined in claim 18, wherein the calling party identifier information associated with the calling party communication device is retrieved by the processing entity from said database on the basis of a telephony identifier associated with the calling party communication device.

21. A system as defined in claim 18, further comprising a memory unit, said processing unit being operative for temporarily storing the modified calling party identifier information in said memory unit.

22. A system as defined in claim 17, wherein both the first called party communication device and the second called party communication device belong to a group of at least two communication devices having a common telephony identifier.

23. A system as defined in claim 17, wherein the modification information received from the first called party communication device is derived from DTMF signals.

24. A system as defined in claim 17, wherein the modification information received from the first called party communication device is derived from voice information.

25. A system as defined in claim 17, wherein the modification information received from the first called party communication device is determined on the basis of a telephony identifier associated with said first called party communication device.

26. A system as defined in claim 17, wherein the modified calling party identifier information comprises information indicative of an importance level associated with the telephony communication.

27. A system as defined in claim 17, wherein the modified calling party identifier information includes additional information associated with the calling party communication device.

28. A system as defined in claim 18, wherein the telephony identifier is a telephone number.

29. A system as defined in claim 17, wherein the calling party identifier information comprises a telephone number of the calling party communication device.

30. A system as defined in claim 17, wherein the calling party identifier information comprises a name of a user associated with the calling party communication device.

31. A system as defined in claim 17, wherein the identification of a second called party communication device is received from a user of the first called party communication device.

32. A system as defined in claim 31, wherein the identification of a second called party communication device is received via dial tone signals.

33. A system as defined in claim 31, wherein the identification of a second called party communication device is received via a voice input.

34. A system as defined in claim 33, wherein the identification of a second. called party communication device includes a name of a user associated with the second called party communication device.

35. A network entity, comprising:
  a. a processing unit for:
    i. causing a telephony communication originating from a calling party communication device to be routed to a first called party communication device together with calling party identifier information associated with the calling party communication device;
    ii. receiving an identification of a second called party communication device to which the telephony communication should be routed;
    iii. generating modified calling party identifier information, via manual input by a user of the first called party communication device associated with the telephony communication on the basis of modification information received from the first called party communication device;
  b. an output for releasing the modified calling party identifier information to a routing entity such that the telephony communication is routed to the second called party communication device together with the modified calling party identifier information,
  wherein the modified calling party identifier information comprises ID information associated with a user of the first called party communication device and ID information associated with a user of the second called party communication device, the first called party and the second called party being distinct parties.

36. A network entity as defined in claim 35, wherein said processing unit is in communication with a database, the database comprising a plurality of entries, each entry including:
  a. a telephony identifier associated with at least one communication device;
  b. calling party identifier information associated with the telephony identifier.

37. A network entity as defined in claim 36, wherein the calling party identifier information associated with the calling party communication device is retrieved by said processing entity from said database on the basis of a telephony identifier associated with the calling party communication device.

38. A network entity as defined in claim 35, further comprising a memory unit, said processing unit being operative for temporarily storing the modified calling party identifier information in said memory unit.

39. A network entity as defined in claim 35, wherein both the first called party communication device and the second called party communication device belong to a group of at least two communication devices having a common telephony identifier.

40. A network entity as defined in claim 35, wherein the modification information received from the first called party communication device is derived from DTMF signals.

41. A network entity as defined in claim 35, wherein the modification information received from the first called party communication device is derived from voice information.

42. A network entity as defined in claim 35, wherein the modification information received from the first called party communication device is derived on the basis of a telephony identifier associated with said first called party communication device.

43. A network entity as defined in claim 35, wherein the modified calling party identifier information comprises information indicative of an importance level associated with the telephony communication.

44. A network entity as defined in claim 35, wherein the modified calling party identifier information includes additional information associated with the calling party communication device.

45. A network entity as defined in claim 39, wherein the telephony identifier is a telephone number.

46. A network entity as defined in claim 35, wherein the calling party identifier information comprises a telephone number of the calling party communication device.

47. A network entity as defined in claim 35, wherein the calling party identifier information comprises a name of a user associated with the calling party communication device.

48. A network entity as defined in claim 35, wherein the identification of a second called party communication device is received from the first called party communication device.

49. A network entity as defined in claim 48, wherein the identification of a second called party communication device is received via dial tone signals.

50. A network entity as defined in claim 48, wherein the identification of a second called party communication device is received via voice information.

51. A network entity as defined in claim 50, wherein the identification of a second called party communication device includes a name of a user associated with the second called party communication device.

52. A non-transitory tangible computer-readable storage medium comprising a program element for execution by a network entity, said program element comprising:
  a. a first program code for identifying a calling party identifier associated with a calling party communication device;
  b. a second program code for causing a telephony communication originating from the calling party communication device to be routed to a first called party communication device together with the calling party identifier information associated with the calling party communication device;
  c. a third program code for generating modified calling party identifier information, via manual input by a user of the first called party communication device, upon receipt of an identification of a second called party communication device to which the telephony communication should be routed;
  d. a fourth program code for causing the telephony communication to be routed to the second called party communication device together with the modified calling party identifier information,
  wherein the modified calling party identifier information comprises ID information associated with a user of the first called party communication device and ID information associated with a user of the second called party communication device, the first called party and the second called party being distinct parties.

* * * * *